Patented June 4, 1935

2,003,703

UNITED STATES PATENT OFFICE 2,003,703

BENZYL PIPERIDINE-1-CARBOTHIONOLATE AND PROCESS OF PREPARING THE SAME

Douglas Frank Twiss, Sutton Coldfield, and Frederick Arthur Jones, Birmingham, England, assignors to Dunlop Tire and Rubber Corporation, Buffalo, N. Y., a corporation of New York No Drawing. Application February 17, 1931, Serial No. 516,510. In Great Britain February 22, 1930

2 Claims. (Cl. 260—43)

This invention relates to improvements in the manufacture of vulcanized rubber compositions and particularly to the use of accelerators of vulcanization.

Objects of the invention are to provide an improved vulcanization accelerator, improved processes of vulcanization and improved vulcanized products. Other objects of the invention are more particularly to provide an accelerator having greater stability during storage and greater stability against oxidation, having low melting points and reduced tendencies against scorching during vulcanization, and that form good colloidal dispersions with water.

A further object and feature of this invention is the incorporation into rubber compositions containing a vulcanizing agent such as sulphur of an accelerator of vulcanization produced by the condensation of such known accelerators as mercaptobenzothiazole and dithiocarbamates with aliphatic radicals substituted with an aromatic nucleus, as for example, the benzyl and nitrobenzyl radicals (ortho-,meta-,para-).

Mercaptobenzothiazole and the dithiocarbamates and their analogues have been found to possess accelerating effects on the vulcanizing process.

It has now been found that the products produced by the condensation of these known accelerators with aliphatic radicals substituted with an aromatic nucleus increases the useful properties of these known accelerators.

The new accelerators made according to the present invention are found to have greater stability during storage. They are also found to have a reduced tendency towards scorching. They are also more stable towards oxidation and, therefore, tend to be more constant in their composition and they are also relatively free from unpleasant taste and harmful effects. They possess low melting points and mix easily and uniformly into rubber and, moreover, they form good colloidal dispersions with water.

According to the present invention we find that by condensing mercaptobenzothiazole, dithriocarbamates or their respective analogues with aliphatic radicals substituted with an aromatic nucleus, we are able to produce solid reaction products which exert excellent accelerating effects on the vulcanization operation.

Examples of the method of preparation of such compounds are as follows:

Example I 11 grams of diethylammonium diethyldithiocarbamate is heated with an alcoholic solution of 2.8 grams of potassium hydroxide until the diethylamine is completely evolved. The hot alcohol solution is then mixed with a hot solution of 8.5 grams para-nitrobenzyl chloride in 100 ccs. alcohol and the mixture boiled under a reflux condenser for a period of one hour. A red oil slowly separates out together with a white crystalline powder of potassium chloride. The mixture after boiling is poured into 400 ccs. of distilled water and the oil washed free from soluble chlorides with cold water by means of decantation. The oil is then separated as completely as possible from water and dried at 100° C. The oil thus obtained sets on cooling to a reddish brown solid having a melting point of about 56° C.

The following chemical equation illustrates the process herein described:

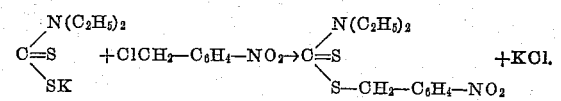

The solid para-nitrobenzyl diethyldithiocarbamate is soluble in hot alcohol and on pouring the hot alcoholic solution into cold water, a good colloidal dispersion is obtained.

The mixes containing the nitrobenzyl compound were made up as follows:

| | Parts by weight |
|---|---|
| Pale crepe rubber | 100 |
| Sulphur | 5 |
| Zinc oxide | 2 |
| Nitrobenzyl compound | 0.5 and 1 respectively |

Both mixes were found to give good vulcanization in thirty minutes at 128° C.

Example II 8.4 grams of mercaptobenzthiazole are heated with a solution of 2.8 grams of potassium hydroxide in 20 ccs. of water and the hot solution is added to a hot solution of 8.6 grams para-nitrobenzyl chloride in 100 ccs. of alcohol and the mixture refluxed for about sixty minutes. A yellow oil separates out together with potassium chloride crystals. After heating, the reaction mixture is poured into 500 ccs. of cold water. The yellow compound solidifies and is washed with cold water until it is free from soluble chlorides and is then separated by filtration and dried at 100° C.

The para-nitro-benzylthiobenzthiazole after drying melts at about 49° C. and is practically odorless and tasteless. The yield obtained is about 70 per cent theoretical.

The following chemical equation illustrates the process herein described:

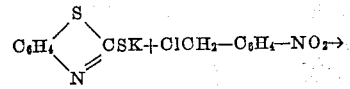

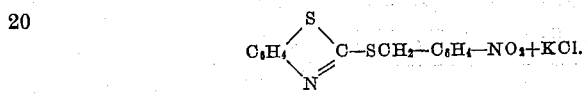

A mixing containing this nitrobenzyl compound was made up as follows:

| | Parts by weight |
|---|---|
| Pale crepe paper | 100 |
| Sulphur | 5 |
| Zinc oxide | 5 |
| Nitrobenzyl compound | 0.3 |

The mix was found to give good vulcanization in sixty minutes at 138° C.

Example III 167 grams mercaptobenzthiazole are heated with 56 grams of potassium hydroxide dissolved in 1000 ccs. water. The solution is evaporated to small bulk and added to a hot solution of 127 grams benzyl chloride in 1500 grams of alcohol. The mixture is boiled for about one hour under reflux. Potassium chloride separates out as a crystalline powder and a yellow oil is also obtained. The mixture after heating, is poured into a large volume of water and the yellow oil separated and washed until free from chlorides. After drying the oil solidifies to a solid melting at about 34° C. The compound is practically odorless and tasteless. The yield obtained was about 70 per cent of the theoretical. The substance is assumed to be benzylbenzthiazyl sulphide (1-benzylthiobenzthiazole).

A mixture of—

| | Parts by weight |
|---|---|
| Rubber | 100 |
| Sulphur | 5 |
| Zinc oxide | 5 |
| Benzylbenzthiazyl sulphide | 1 | gave a good vulcanzate on heating to 138° for sixty minutes.

Example IV 123 grams of piperidine piperidine-1-carbothionolate are heated with 28 grams of potassium hydroxide in aqueous solution until piperidine is no longer evolved and the solution has evaporated to small bulk. This solution is added to a hot solution of 63 grams benzyl chloride in 1000 grams of alcohol and the mixture then refluxed for about one hour. A red oil separates out together with potassium chloride crystals. After heating, the reaction mixture is poured into excess of water and the oil washed free from soluble chloride. The dry oil, after cooling in ice, solidifies to a solid which melts at about 15° C.

The solid is assumed to be benzyl piperidine-1-carbothionolate (piperidine-1-dithiocarboxylic acid benzyl ester).

A vulcanization test was made on a mixing of—

| | Parts by weight |
|---|---|
| Rubber | 100 |
| Zinc oxide | 5 |
| Sulphur | 5 |
| Benzyl piperidine-1-carbothionolate | 1 | and after curing for sixty minutes at 128° C. the sample was well vulcanized.

What we claim is:
1. Benzyl piperidine-1-carbothionolate.
2. A process of forming vulcanization accelerators which comprises reacting benzyl chloride with potassium piperidine-1-carbothionolate.

DOUGLAS FRANK TWISS.
FREDERICK ARTHUR JONES.